(12) United States Patent
Kim et al.

(10) Patent No.: US 7,480,015 B2
(45) Date of Patent: Jan. 20, 2009

(54) METHOD FOR MANUFACTURING ARRAY SUBSTRATE OF TRANSLUCENT LCD

(75) Inventors: Byung Hoon Kim, Kyoungki-do (KR); Sam Ho Ihm, Seoul (KR)

(73) Assignee: HYDIS Technology Co., Ltd., Gyeonggi-do (KR)

( * ) Notice: Subject to any disclaimer, the term of this patent is extended or adjusted under 35 U.S.C. 154(b) by 272 days.

(21) Appl. No.: 11/595,455

(22) Filed: Nov. 9, 2006

(65) Prior Publication Data

US 2007/0109455 A1    May 17, 2007

(30) Foreign Application Priority Data

Nov. 11, 2005    (KR) ........................ 10-2005-0108016

(51) Int. Cl.
   *G02F 1/136*    (2006.01)
(52) U.S. Cl. ..................... 349/43; 438/30; 349/114
(58) Field of Classification Search .................. 349/43, 349/114; 438/30
   See application file for complete search history.

(56) References Cited

U.S. PATENT DOCUMENTS

2006/0146256 A1* 7/2006 Ahn ........................ 349/141

FOREIGN PATENT DOCUMENTS

| JP | 2005-323705 | 11/2002 |
|---|---|---|
| JP | 2004-070716 | 3/2004 |
| KR | 10-2005-50016098 A | 2/2005 |
| KR | 10-2005-50095017 A | 9/2005 |

\* cited by examiner

*Primary Examiner*—Sarah Song

(57) ABSTRACT

Disclosed is a method for manufacturing an array substrate of a translucent LCD capable of simultaneously forming source and drain metal layers as reflective electrodes while improving both the contact resistance in a transmissive region and the reflectivity properties in a reflective region. The source and drain metal layers have a triple-layered structure of Mo—Al—Mo and, the top Mo is selectively removed from the reflective region. As a result, the screen quality of products improves. In addition, about 5-6 masks are enough to manufacture an array substrate using half-tone exposure technology, in contrast to the prior art which uses 8-11 masks. As the number of masks and processes is reduced in this manner, the manufacturing cost decreases accordingly and the process is simplified.

14 Claims, 10 Drawing Sheets

METHOD FOR MANUFACTURING ARRAY SUBSTRATE OF TRANSLUCENT LCD

BACKGROUND OF THE INVENTION

1. Field of the invention

The present invention relates to a method for manufacturing a translucent LCD, and more particularly to a method for manufacturing an array substrate of a translucent LCD capable of providing low contact resistance in a transmissive region and high reflectivity properties in a reflective region while simplifying processes.

2. Description of the Prior Art

As generally known in the art, LCDs include two substrates having electrodes formed thereon and a liquid crystal layer interposed between them. By applying a voltage to the electrodes, liquid crystal molecules in the liquid crystal layer are rearranged. As a result, the amount of transmitted light is adjusted, and predetermined images are realized.

LCDs may be classified into transmissive LCDs using a light source, such as a backlight, to display images and reflective LCDs using natural light as the light source. The transmissive LCDs can realize bright images even in dark surroundings, because they use a backlight as the light source. However, much power is consumed by the backlight. In contrast, the reflective LCDs consume little power, because they use natural light from surroundings instead of the backlight. However, reflective LCDs cannot be used when the surroundings are dark.

In an attempt to solve these problems, a translucent LCD has been proposed, the pixel unit of which is divided into transmissive and reflective regions so that, when no external light source exists (e.g. indoor or dark place), its own internal light source is used to display images and, when there is enough light (e.g. outdoor place), incident light from the exterior is reflected to display images.

FIG. 1 is a sectional view showing an array substrate of a conventional translucent TN (twisted nematic)-mode LCD disclosed in Korean Patent Publication No. 2004-0070716. A method for manufacturing the array substrate will now be described with reference to the drawing.

As shown, a gate metal layer is deposited on a glass substrate 1, the pixel unit of which has been divided into a TFT (thin film transistor) region TFT, a reflective region R, and a transmissive region T. The gate metal layer is patterned to form a number of gate lines (not shown) on the interface of the pixel unit while being arranged in the transverse direction, including a gate electrode 2 positioned in the TFT region TFT. A gate insulation layer 3 is formed on the front surface of the substrate 1 to cover the gate lines, including the gate electrode 2.

A non-doped amorphous silicon layer and a doped amorphous silicon layer are successively formed on the gate insulation layer 3 and are patterned to form active patterns in the TFT region TFT. An organic insulation layer 6 is selectively formed on a part of the gate insulation layer 3 positioned in the reflective region R, but not those in the TFT and transmissive regions TFT and T, in such a manner that the organic insulation layer 6 has a number of protrusions on its surface. The organic insulation layer 6 is patterned and, as a result, a first opening 7 is formed in the transmissive region T while extending through the organic insulation layer 6.

After forming the active patterns and the organic insulation layer 6, source and drain metal layers are deposited on the resulting substrate and are patterned to form a number of data lines (not shown) at the interface of the pixel unit while being arranged in a longitudinal direction so that they are substantially perpendicular to the gate lines. Simultaneously, source and drain electrodes 8a and 8b are formed in the TFT region TFT. A part of the doped amorphous silicon layer between the source and drain electrodes 8a and 8b is etched to form an ohmic layer 5 and a channel layer 4, which is made of the non-doped amorphous silicon layer. As a result, a TFT 10 is constructed in the TFT region TFT. When the data lines are formed, a reflective electrode 11 is simultaneously formed on the organic insulation layer 6 in the reflective region R, for example, while being integral with the source electrode 8a of the TFT 10.

A protective layer 12 is formed on the resulting substrate to cover the TFT 10 and the reflective electrode 11. The protective layer 12 is etched to form a via hole 13 for exposing the source electrode 8a and remove a part of the protective layer 12 in the transmissive region T, so that a second opening 14 is formed. An ITO layer is deposited on the protective layer 12 and is patterned to form a pixel electrode 15, which contacts the source electrode 8a through the via hole 13. This completes an array substrate.

As mentioned above, conventional translucent LCDs use source and drain metal layers, which are made of metal having a high reflectivity, as reflective electrodes. For example, the source and drain electrodes are composed of a single layer, which is made of any one of Al, Al alloy, Ag, and Ag alloy. Alternatively, the source and drain electrodes are composed of a dual layer, which includes a lower layer made of any one of Cr, Ti, and MoW and an upper layer made of Al or Ag.

However, any metal belonging to Al series has high contact resistance with ITO, which constitutes the pixel electrodes, and does not emit light easily. Even when light is emitted, mura and luminance deteriorate. This degrades screen quality. In contrast, any metal belonging to Ag series has low contact resistance with the ITO, and the problems related to the use of Al-series metal can be avoided. However, Ag-series metal is expensive and is practically impossible to use, considering the production cost.

In summary, conventional translucent LCDs using source and drain metal layers as reflective electrodes cannot meet consumers' expectations, due to problems related to contact resistance with the ITO layer and increased cost.

In the case of conventional translucent LCDs, a total of 8-11 masks are necessary to manufacture their array substrate. Particularly, 5-8 masks are used to form a transmissive region, and at least 3 masks are used to form a reflective region through processes for forming a via on a resin layer, forming embossing, and forming a reflective electrode.

FIG. 2 is a sectional view showing an array substrate of a conventional translucent TN-mode LCD. The array substrate is manufactured by successively performing: a first mask process for forming a gate line and a common electrode line, including a gate electrode 2; a second mask process for forming an active pattern; a third mask process for forming a data line, including source and drain electrodes 8a and 8b; a fourth mask process for forming a via which exposes the source and drain electrodes 8a and 8b; a fifth mask process for forming a pixel electrode 15 of ITO; a sixth mask process for forming a via 13 on a resin layer 6; a seventh mask process for forming embossing 16 in a reflective region R; and an eighth mask process for forming a reflective electrode 11 in the reflective region R.

When the reflective region R is formed, at least 3 masks are additionally used to form the via 13 on the resin layer 6, form the embossing 16, and form the reflective electrode 11, compared with the case of forming a transmissive region T.

FIG. 3 is a sectional view showing an array substrate of a conventional translucent FFS (fringe field switching)-mode LCD. The array substrate is manufactured by successively performing: a first mask process for forming a gate line and a common electrode line 2a, including a gate electrode 2, as well as forming an embossing pattern 2b in a reflective region R; a second mask process for forming an active pattern; a third mask process for forming a data line, including source and drain electrodes 8a and 8b; a fourth mask process for forming a via 9 which exposes the common electrode line 2a; a fifth mask process for forming a plate-type counter electrode 17 in a transmissive region T; a sixth mask process for forming an reflective electrode 11 in the reflective region R; a seventh mask process for forming a via 13 which exposes the source and drain electrodes 8a and 8b; and an eighth mask process for forming a slit-type pixel electrode 15 in the transmissive and reflective regions T and R.

When the reflective region R is formed in the FFS-mode LCD, at least 2 additional masks are used to form the via 9 on the resin layer 6 to expose the common electrode line 2a and form the reflective electrode 11, as compared with the case of forming the transmissive region T. As a result, a total of at least 8 masks are used for the whole substrate.

As mentioned above, conventional translucent LCDs use at least 8 masks to manufacture their array substrate. In addition, each mask process includes a process for applying a photosensitive layer, a process for exposing the applied photosensitive layer to light using a mask, a process for developing the exposed photosensitive layer, and a thermal process (e.g. soft or hard baking). Consequently, conventional methods for manufacturing an array substrate of a translucent LCD, which require at least 8 masks, are very complicated and incur great costs.

In FIGS. 2 and 3, reference numeral 1 refers to a glass substrate, 3 is a gate insulation layer, 4 is a channel layer, 5 is an ohmic layer, 10 is a TFT, 11a is an Al metal layer, 11b is an Mo metal layer, 12 is a protective layer, and 14a is an opening.

SUMMARY OF THE INVENTION

Accordingly, the present invention has been made to solve the above-mentioned problems occurring in the prior art, and an object of the present invention is to provide a method for manufacturing an array substrate of a translucent LCD capable of simultaneously forming source and drain metal layers as reflective electrodes while improving both the contact resistance in a transmissive region and the reflectivity properties in a reflective region.

Another object of the present invention is to provide a method for manufacturing an array substrate of a translucent LCD capable of improving both the contact resistance in a transmissive region and the reflectivity properties in a reflective region for stable operation while securing excellent screen quality.

Still another object of the present invention is to provide a method for manufacturing an array substrate of a translucent LCD capable of reducing the number of mask processes for process simplification and manufacturing cost saving.

In order to accomplish this object, there is provided a method for manufacturing an array substrate of a translucent LCD including the steps of forming an ITO layer and a gate metal layer successively on a glass substrate, the pixel unit of the glass substrate being divided into a TFT region, a reflective region, and a transmissive region; performing a first mask process using half-tone exposure technology and an etching process to the gate metal layer and the ITO layer to form a gate line, a common electrode line, a plate-type counter electrode of ITO, and an embossing pattern, the gate line including a gate electrode, the counter electrode being positioned in the transmissive region, and the embossing pattern being positioned in the reflective region; forming a gate insulation layer, an amorphous silicon layer, and a doped amorphous silicon layer successively on a front surface of the glass substrate having the gate line including the gate electrode, the common electrode line, the counter electrode, and the embossing pattern formed thereon; performing a second mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region; forming a triple layer on the gate insulation layer including the first via hole and the active pattern by successively forming a bottom Mo layer, an Al layer, and a top Mo; performing a third mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region; forming a protective layer on a front surface of a resultant having the source/drain electrode and the reflective electrode formed thereon; performing a fourth mask process and an etching process to the protective layer to form a second via hole exposing the source/drain electrode; forming an ITO layer on the protective layer including the second via hole; and performing a fifth mask process and an etching process to the ITO layer to form a slit-type pixel electrode positioned in both the transmissive and reflective regions while contacting the source/drain electrode.

The step of performing a first mask process and an etching process to form a gate line, a common electrode line, a counter electrode, and an embossing pattern includes the steps of applying a half-tone exposure process to the gate metal layer to form a first photosensitive layer pattern in such a manner that a part of the first photosensitive layer pattern covering a region for forming a counter electrode has a thickness smaller than a thickness of parts of the first photosensitive layer pattern covering a region for forming a gate line including a gate electrode, a region for forming a common electrode line, and a region for forming an embossing pattern; etching the gate metal layer and the ITO layer using the first photosensitive layer pattern as an etching mask to form a gate line including a gate electrode, a common electrode line, and an embossing pattern; ashing the first photosensitive layer pattern to remove the part of the first photosensitive layer pattern covering the region for forming a counter electrode; removing the gate metal layer on the counter electrode using the ashed first photosensitive layer pattern as an etching mask; and removing the remaining first photosensitive layer pattern.

The step of performing a second mask process and an etching process to form a first via hole and an active pattern includes the steps of applying a half-tone exposure process to the doped amorphous silicon layer to form a second photosensitive layer pattern in such a manner that a part of the second photosensitive layer pattern covering the transmissive region has a thickness smaller than a thickness of parts of the second photosensitive layer pattern covering a region for forming an active pattern and a region for forming a reflective electrode; etching the doped amorphous silicon layer, the amorphous silicon layer, and the gate insulation layer using the second photosensitive layer pattern as an etching mask to form a first via hole for exposing the common electrode line; ashing the second photosensitive layer pattern to remove a part of the second photosensitive layer pattern formed in the transmissive region; etching the doped amorphous silicon layer and the amorphous silicon layer using the ashed second photosensitive layer pattern as an etching mask to form an active pattern; and removing the remaining second photosensitive layer pattern.

The step of performing a third mask process and an etching process to form a data line and a reflective electrode includes the steps of applying a half-tone exposure process to the triple layer having a bottom Mo layer, an Al layer, and a top Mo layer formed on one another to form a third photosensitive layer pattern in such a manner that a part of the third photosensitive layer pattern covering a region for forming a reflective electrode has a thickness smaller than a thickness of a part of the third photosensitive layer pattern covering a region for forming a data line including a source/drain electrode; etching the triple layer using the third photosensitive layer pattern as an etching mask to form a data line including a source/drain electrode; ashing the third photosensitive layer pattern to remove a part of the third photosensitive layer pattern formed in the region for forming a reflective electrode; etching the top Mo layer in the reflective region using the ashed third photosensitive layer pattern as an etching mask to form a reflective electrode as a dual layer having a bottom Mo layer and an Al layer; and removing the remaining third photosensitive layer pattern.

The bottom Mo layer is formed with a thickness of 500-700 Å, the Al layer is formed with a thickness of 1400-1600 Å, and the top Mo layer is formed with a thickness of 100-200 Å.

The reflective electrode is formed to have embossing by means of the embossing pattern.

The transmissive and reflective regions are driven in an FFS mode by horizontal electrical fields between the counter and pixel electrodes and between the reflective and pixel electrodes, respectively.

In accordance with another aspect of the present invention, there is provided a method for manufacturing an array substrate of a translucent LCD including the steps of forming an ITO layer and a gate metal layer successively on a glass substrate, the pixel unit of the glass substrate being divided into a TFT region, a reflective region, and a transmissive region; forming an ITO layer on the gate metal layer; performing a first mask process and an etching process to the ITO layer to form a plate-type counter electrode of ITO in the transmissive region; forming a gate metal layer on the glass substrate having the counter electrode formed thereon; performing a second mask process and an etching process to the gate metal layer to form a gate line, a common electrode line, and an embossing pattern, the gate line including a gate electrode, and the embossing pattern being positioned in the reflective region; forming a gate insulation layer, an amorphous silicon layer, and a doped amorphous silicon layer successively on a front surface of the glass substrate having the gate line including the gate electrode, the common electrode line, the counter electrode, and the embossing pattern formed thereon; performing a third mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region; forming a triple layer on the gate insulation layer including the first via hole and the active pattern by successively forming a bottom Mo layer, an Al layer, and a top Mo; performing a fourth mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region; forming a protective layer on a front surface of a resultant having the source/drain electrode and the reflective electrode formed thereon; performing a fifth mask process and an etching process to the protective layer to form a second via hole exposing the source/drain electrode; forming an ITO layer on the protective layer including the second via hole; and performing a sixth mask process and an etching process to the ITO layer to form a slit-type pixel electrode contacting the source/drain electrode.

In accordance with another aspect of the present invention, there is provided a method for manufacturing an array substrate of a translucent LCD including the steps of forming a gate metal layer on a glass substrate, the pixel unit of the glass substrate being divided into a TFT region, a reflective region, and a transmissive region; performing a first mask process and an etching process to the gate metal layer to form a gate line, a common electrode line, and an embossing pattern, the gate line including a gate electrode, and the embossing pattern being positioned in the reflective region; forming a gate insulation layer, an amorphous silicon layer, and a doped amorphous silicon layer successively on a front surface of the glass substrate having the gate line including the gate electrode, the common electrode line, and the embossing pattern formed thereon; performing a second mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region; forming a triple layer on the gate insulation layer including the first via hole and the active pattern by successively forming a bottom Mo layer, an Al layer, and a top Mo; performing a third mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region; forming a protective layer on a front surface of a resultant having the source/drain electrode and the reflective electrode formed thereon; performing a fourth mask process and an etching process to the protective layer to form a second via hole exposing the source/drain electrode; forming an ITO layer on the protective layer including the second via hole; and performing a fifth mask process and an etching process to the ITO layer to form a pixel electrode in the transmissive region while contacting the source/drain electrode.

The step of performing a second mask process and an etching process to form a first via hole and an active pattern includes the steps of applying a half-tone exposure process to the doped amorphous silicon layer to form a second photosensitive layer pattern in such a manner that a part of the second photosensitive layer pattern covering the transmissive region has a thickness smaller than a thickness of parts of the second photosensitive layer pattern covering a region for forming an active pattern and a region for forming a reflective electrode; etching the doped amorphous silicon layer, the amorphous silicon layer, and the gate insulation layer using the second photosensitive layer pattern as an etching mask to form a first via hole for exposing the common electrode line; ashing the second photosensitive layer pattern to remove a part of the second photosensitive layer pattern formed in the transmissive region; etching the doped amorphous silicon layer and the amorphous silicon layer using the ashed second photosensitive layer pattern as an etching mask to form an active pattern; and removing the remaining second photosensitive layer pattern.

The step of performing a third mask process and an etching process to form a data line and a reflective electrode includes the steps of applying a half-tone exposure process to the triple layer having a bottom Mo layer, an Al layer, and a top Mo layer formed on one another to form a third photosensitive layer pattern in such a manner that a part of the third photosensitive layer pattern covering a region for forming a reflective electrode has a thickness smaller than a thickness of a part of the third photosensitive layer pattern covering a region for forming a data line including a source/drain electrode; etching the triple layer using the third photosensitive layer pattern as an etching mask to form a data line including a source/drain electrode; ashing the third photosensitive layer pattern to remove a part of the third photosensitive layer pattern formed in the region for forming a reflective electrode; etching the top Mo layer in the reflective region using the ashed third photosensitive layer pattern as an etching mask to form a reflective electrode as a dual layer having a bottom Mo layer and an Al layer; and removing the remaining third photosensitive layer pattern.

The bottom Mo layer is formed with a thickness of 500-700 Å, the Al layer is formed with a thickness of 1400-1600 Å, and the top Mo layer is formed with a thickness of 100-200 Å.

The reflective electrode is formed to have embossing by means of the embossing pattern.

The transmissive and reflective regions are driven in a TN mode.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
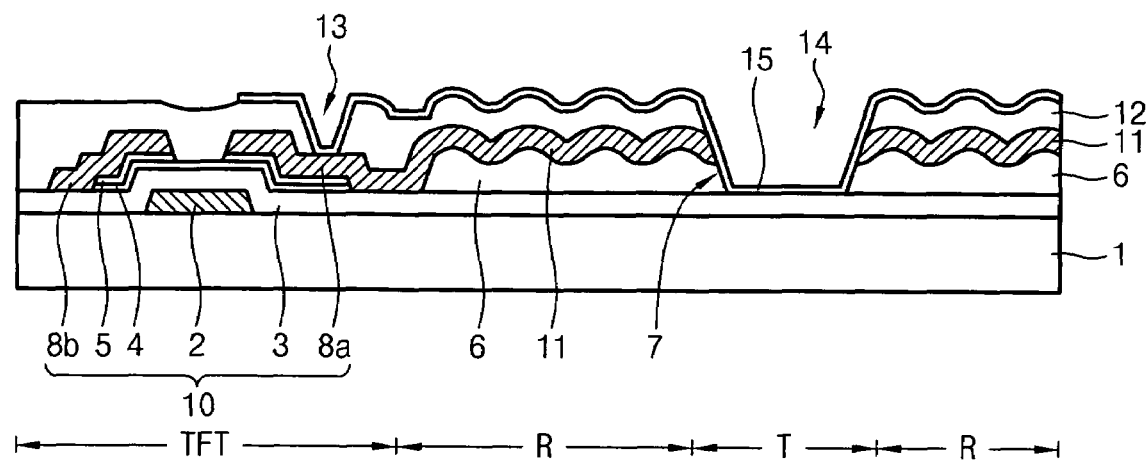
FIG. 1 is a sectional view showing an array substrate of a conventional translucent TN-mode LCD.
Figure 2:
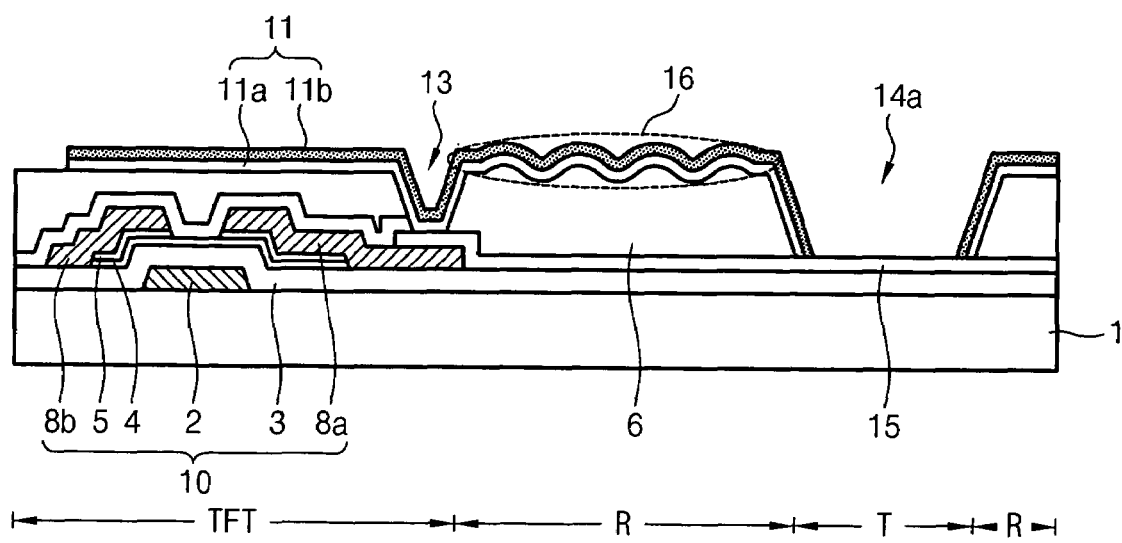
FIG. 2 is a sectional vie showing an array substrate of another conventional translucent TN-mode LCD.
Figure 3:
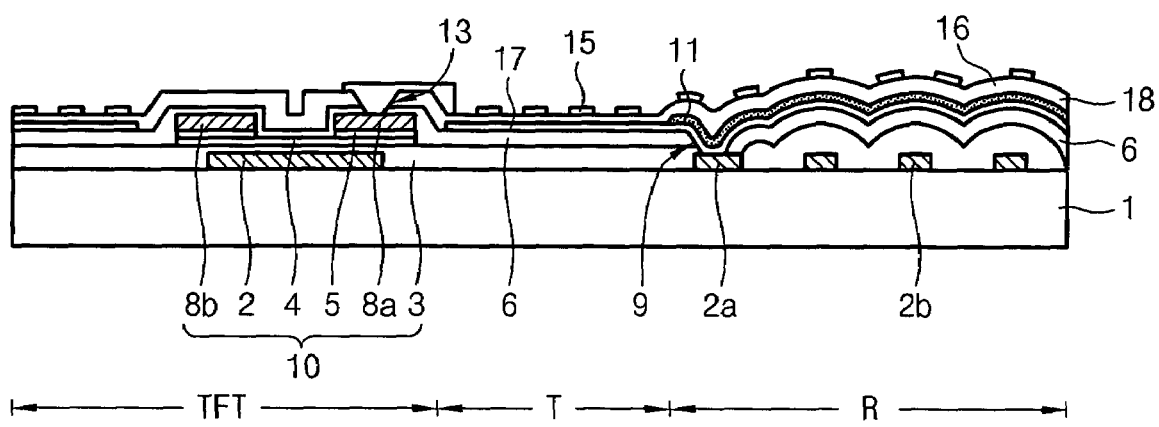
FIG. 3 is a sectional view showing an array substrate of a conventional translucent FFS-mode LCD.

Hereinafter, a preferred embodiment of the present invention will be described with reference to the accompanying drawings. In the following description and drawings, the same reference numerals are used to designate the same or similar components, and so repetition of the description on the same or similar components will be omitted.

The present invention uses a triple layer of Mo—Al—Mo to form source and drain electrodes, as well as a reflective electrode. In a reflective region, the top Mo is removed to expose the Al metal layer, which has a high reflectivity and, in a TFT region, the top Mo remains intact. This secures an excellent level of reflectivity in the reflective region and good electrical contact in the TFT region. As a result, the screen quality of products improves, and the production cost can be reduced by using inexpensive Mo and Al.

In addition, the present invention utilizes half-tone exposure technology to manufacture an array substrate of a translucent LCD through no more than 5-6 mask processes. Besides process simplification, this practice saves on manufacturing costs due to the number of masks and processes being reduced.

FIGS. 4A to 4L are sectional views showing respective processes of a method for manufacturing an array substrate of a translucent FFS-mode LCD according to an embodiment of the present invention, which will now be described.

Figure 4A:
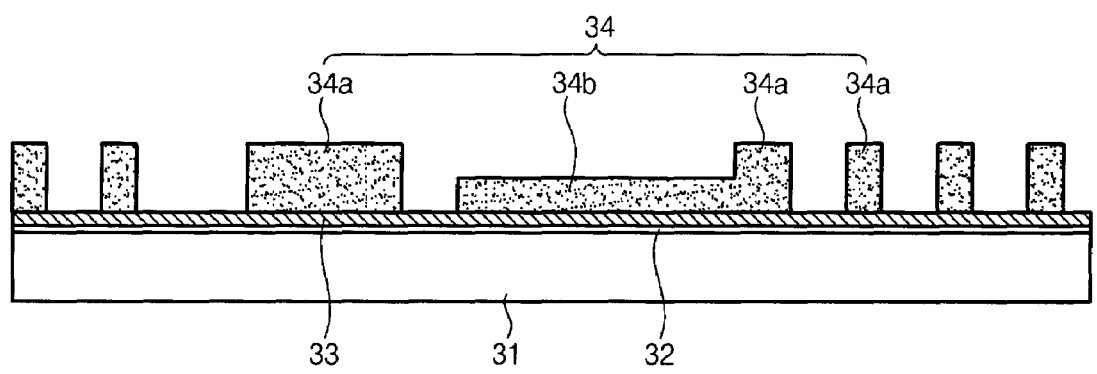
FIGS. 4A to 4L are sectional views showing respective processes of a method for manufacturing an array substrate of a translucent FFS-mode LCD according to an embodiment of the present invention.

Referring to FIG. 4A, an ITO layer 32 and a gate metal layer 33 are successively deposited on a glass substrate 31, the pixel unit of which is divided into a TFT region TFT, a reflective region R, and a transmissive region T. A first mask (not shown) is used to form a first photosensitive layer pattern 34 on the gate metal layer 33 to cover a region for forming a gate line including a gate electrode, a region for forming a common electrode line, a region for forming an embossing pattern in the reflective region R, and a region for forming a counter electrode in the transmissive region T. In particular, the first photosensitive pattern 34 is formed in a half-tone exposure process in such a manner that a part 34b of the first photosensitive region for covering the region for forming a counter electrode has a thickness smaller than that of the remaining part, that is, parts 34a of the first photosensitive layer pattern 34a for covering the region for forming a gate line including a gate electrode, the region for forming a common electrode line, and the region for forming an embossing pattern, respectively.

Figure 4B:
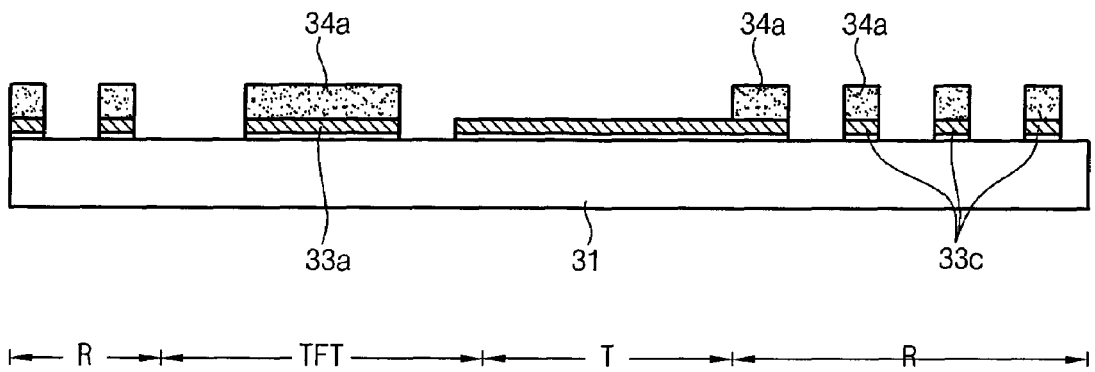

Referring to FIG. 4B, the first photosensitive layer pattern is used as an etching mask to etch the gate metal layer and the ITO layer, so that a gate line (not shown), including a gate electrode 33a, and a common electrode line 33b are formed, and an embossing pattern 33c is formed in the reflective region R. The resultant is subjected to an ashing process to remove a part of the first photosensitive layer pattern formed in the transmissive region T. Since the parts 34a of the first photosensitive layer pattern on the gate line including the gate electrode 33a, the common electrode line 33b, and the embossing pattern 33c, respectively, have a thickness larger than that of the part of the first photosensitive pattern formed on the region for forming the counter electrode in the transmissive region T, they are not completely removed, but a portion of their thickness is preserved.

Figure 4C:
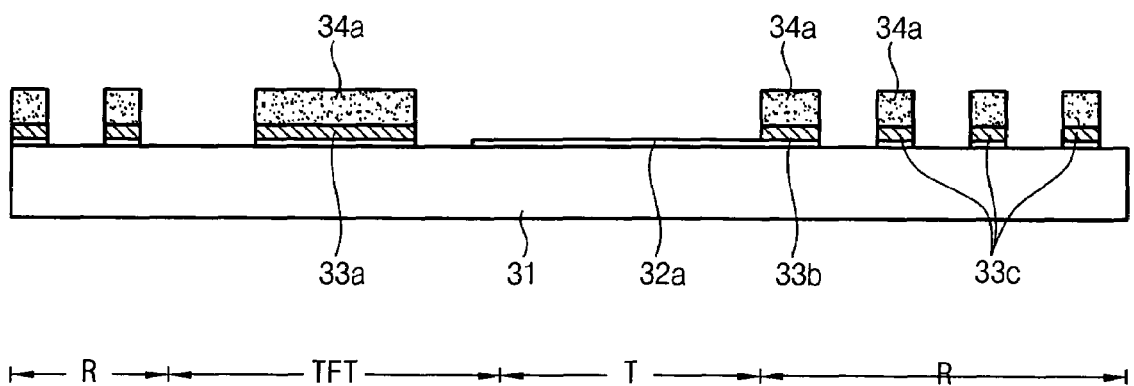

Referring to FIG. 4C, the remaining first photosensitive layer pattern 34a is used as an etching mask to remove the gate metal layer from the exposed transmissive region T, so that a plate-type counter electrode 32a, which is made of an ITO layer, is formed in the transmissive region T.

Figure 4D:
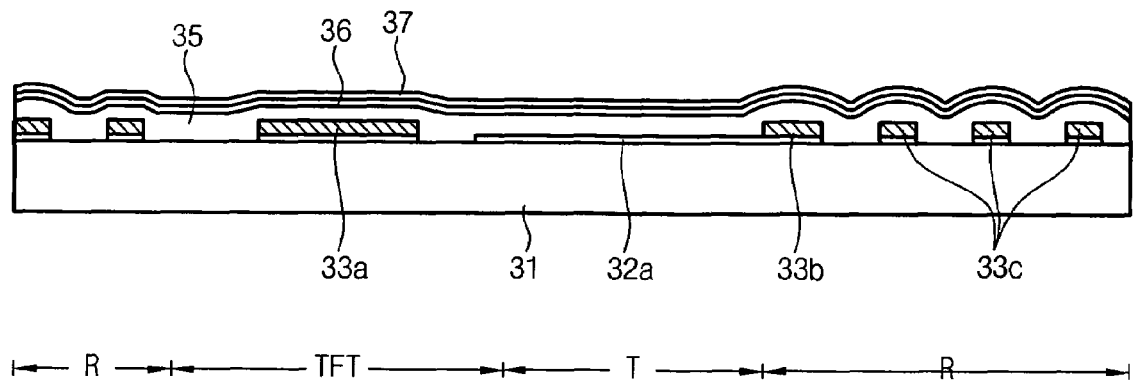

Referring to FIG. 4D, the remaining first photosensitive layer pattern is removed in a conventional process. A gate insulation layer 35 and active layers, particularly, an amorphous silicon layer 36 and a doped amorphous silicon layer 37, are successively formed on the front surface of the glass substrate 31, which has the gate line including the gate electrode 33a, the common electrode line 33b, the embossing pattern 33c, and the counter electrode 32a formed thereon. Because of the embossing pattern 33c formed in the reflective region R, the gate insulation layer 35 and the active layers 36 and 37, which are formed in the reflective region R, have bent surfaces.

Figure 4E:
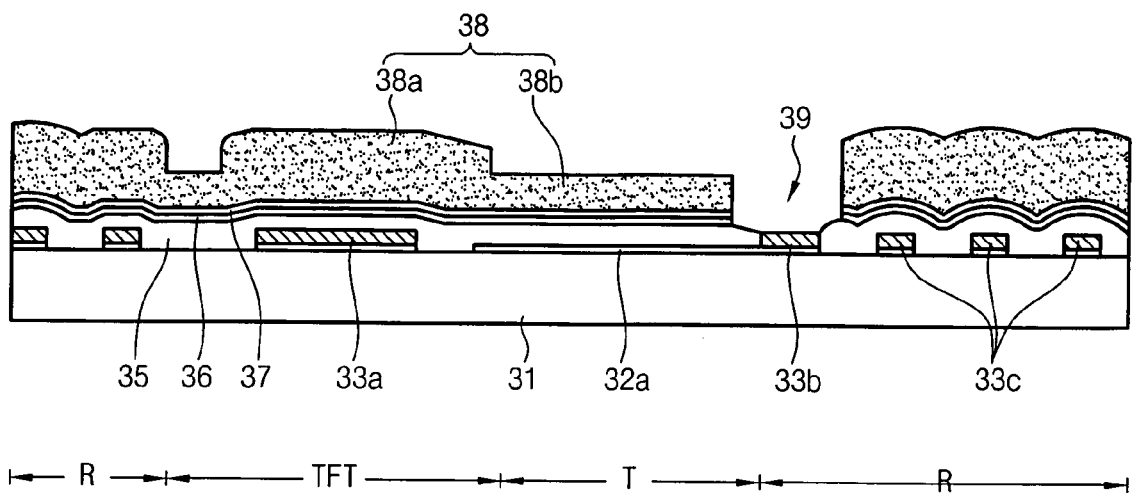

Referring to FIG. 4E, a second mask is used to form a second photosensitive layer pattern 38 on the doped amorphous silicon layer 37 to expose the upper region of the common electrode line 33b. Particularly, half-tone exposure technology is utilized to form the second photosensitive layer pattern 38 in such a manner that a part 38b formed to cover the transmissive region T has a thickness smaller than that of parts 38a for covering a region for forming an active pattern and a region for forming a reflective electrode. The second photosensitive layer pattern 38 is used as an etching mask to etch the active layers 37 and 36 and the gate insulation layer 35, so that a first via hole 39 is formed and exposes the common electrode line 33b.

Figure 4F:
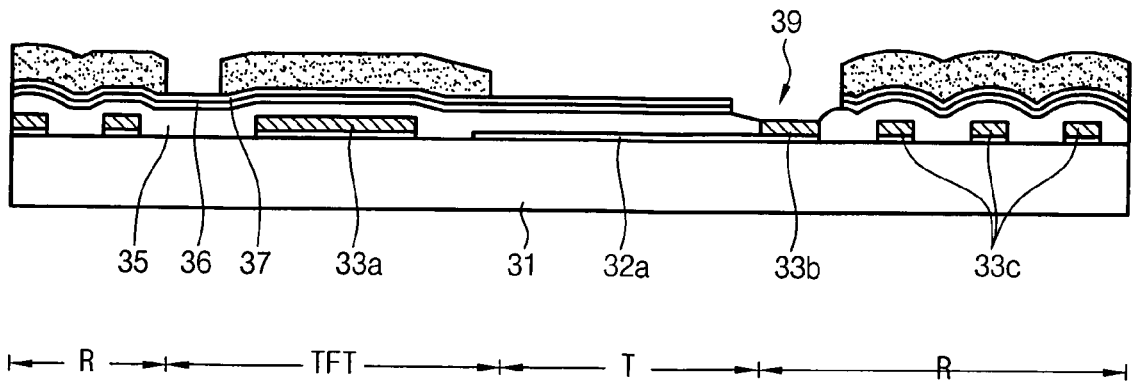

Referring to FIG. 4F, the resultant, having the first via hole 39 formed thereon, is subjected to an ashing process to remove a part of the second photosensitive layer pattern formed in the transmissive region T. Since parts of the second photosensitive layer pattern formed in other regions have a larger thickness, they are not completely removed, but a portion of their thickness is preserved.

Figure 4G:
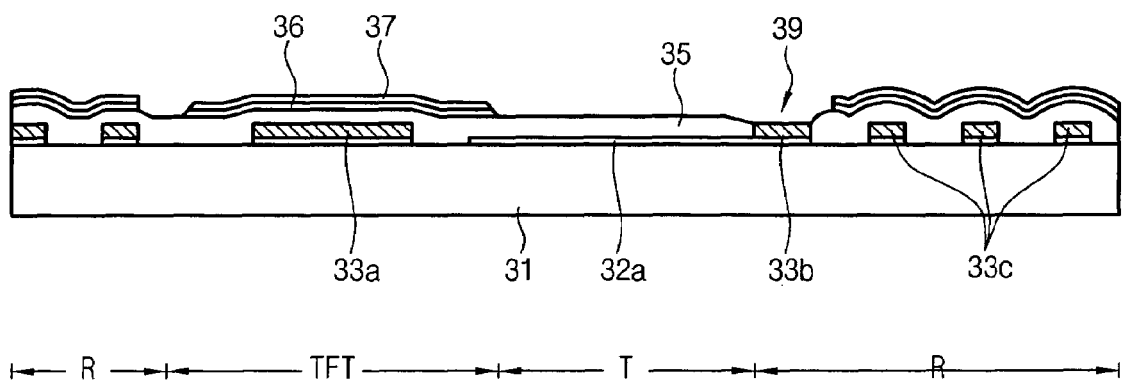

Referring to FIG. 4G, the remaining second photosensitive layer pattern is used as an etching mask to etch the doped amorphous silicon layer and the underlying amorphous silicon layer to form an active pattern. The second photosensitive layer pattern, which has been used as an etching mask, is then removed.

Figure 4H:
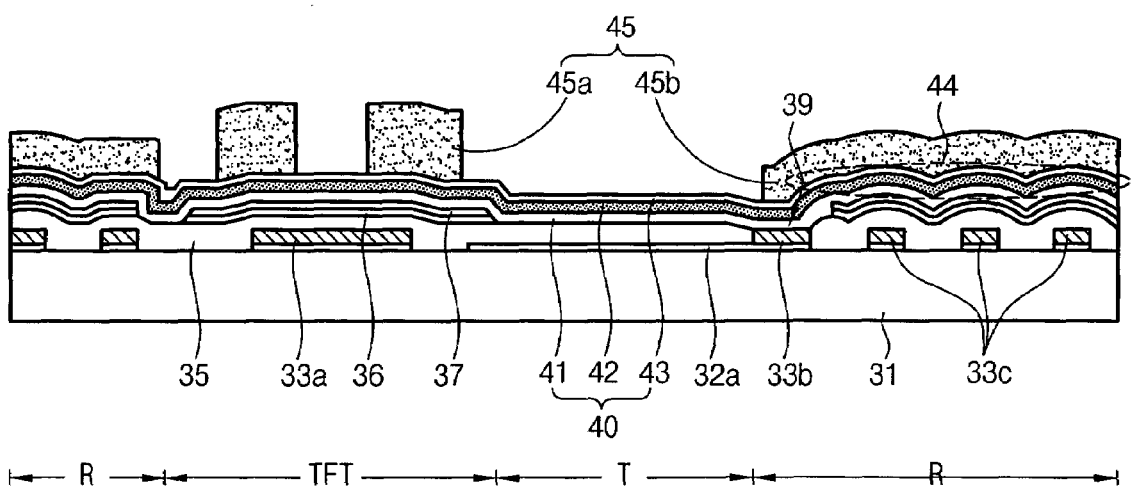

Referring to FIG. 4H, a source/drain metal layer 40 is formed on the front surface of the resultant, which has the active pattern and the first via hole 39 formed thereon. The source/drain metal layer 40 has a triple-layered structure. Particularly, the second layer of the structure acts as a substantial wiring and is made of Al-series metal, which has excellent electrical conductivity and reflectivity. The first layer is positioned beneath the Al-series metal layer and is made of Mo-series metal, in order to prevent the Al-series metal layer from reacting with the gate insulation layer 35. The third layer is positioned on top of the Al-series metal layer and is made of Mo-series metal for easy electrical connection to ITO, which constitutes a pixel electrode. For example, the bottom Mo layer 41 of the triple-layered structure of Mo—Al—Mo has a thickness of 500-700 Å, preferably 600 Å; the Al layer 42 has a thickness of 1400-1600 Å, preferably 1500 Å; and the top Mo layer 43 has a thickness of 100-200 Å, for easy removal in the following process.

The triple-layered source/drain metal layer 40 is connected to the common electrode line 33b through the first via hole 39. The part of the source/drain metal layer 40 formed in the reflective region R has a corrugated surface, i.e. embossing 44, due to the surface corrugation of the primer layer.

A third mask is used to form a third photosensitive layer pattern 45 on the source/drain metal layer 40 to expose a region for forming a data line, including a source/drain electrode, and a region for forming a reflective electrode. Particularly, half-tone exposure technology is used to form the third photosensitive layer pattern 45 in such a manner that a part 45b thereof formed in the region for forming a IS reflective electrode has a thickness smaller than that of parts 45a formed in the remaining region.

Figure 4I:
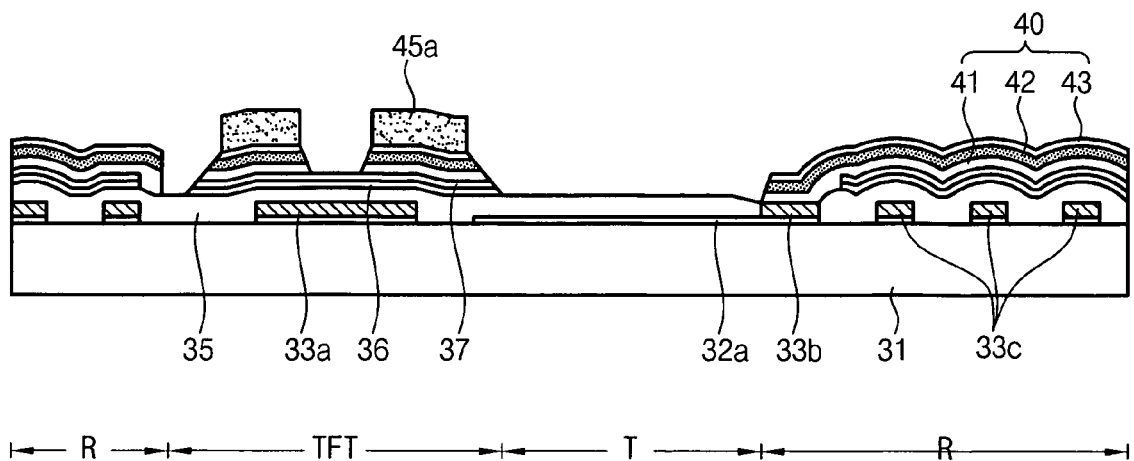

Referring to FIG. 4I, the third photosensitive layer pattern is used as an etching mask to subject the triple-layered source/drain metal layer to wet etching and form a data line (not shown), including source and drain electrodes 46a and 46b. The triple-layered source/drain metal layer still remains in the reflective region R. The resultant, having the source and drain electrodes 46a and 46b formed thereon, is subjected to an ashing process to remove a part of the third photosensitive layer pattern formed in the transmissive region T. Since parts of the third photosensitive layer pattern formed in other regions have a larger thickness, they are not completely removed, but a portion of their thickness is preserved.

Figure 4J:
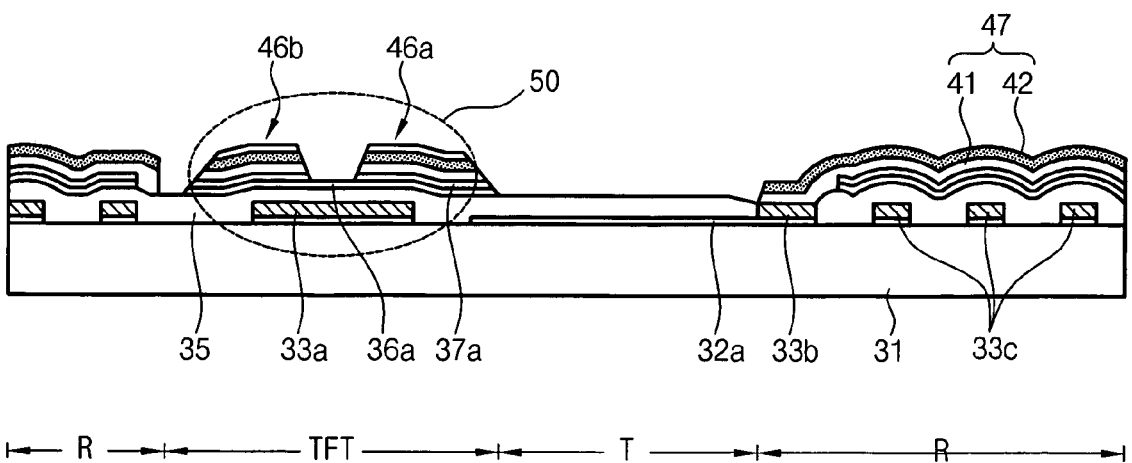

Referring to FIG. 4J, the locally-remaining third photosensitive layer pattern is used as an etching mask to subject the resultant to dry etching, so that the top Mo is removed from the reflective region R, and a reflective electrode 47 is formed as a dual layer including a bottom Mo layer 41 and an Al layer 42. The doped amorphous silicon layer in the TFT region TFT is etched to form an ohmic layer 37a and a channel layer 36a, so that a TFT 50 is constructed. The locally-remaining third photosensitive layer pattern is then removed.

It is to be noted that the reflective electrode 47 has a dual-layered structure, including the bottom Mo layer 41 and Al layer 42, in the reflective region R. In particular, the overlying Al layer 42 provides excellent reflectivity properties. In addition, the source and drain electrodes 46a and 46b have a triple-layered structure, including the bottom Mo layer 41, Al layer 42, and top Mo layer 43, in the TFT region TFT. Particularly, the overlying Mo layer provides good electrical contact with an ITO pixel electrode, which is formed later.

Figure 4K:
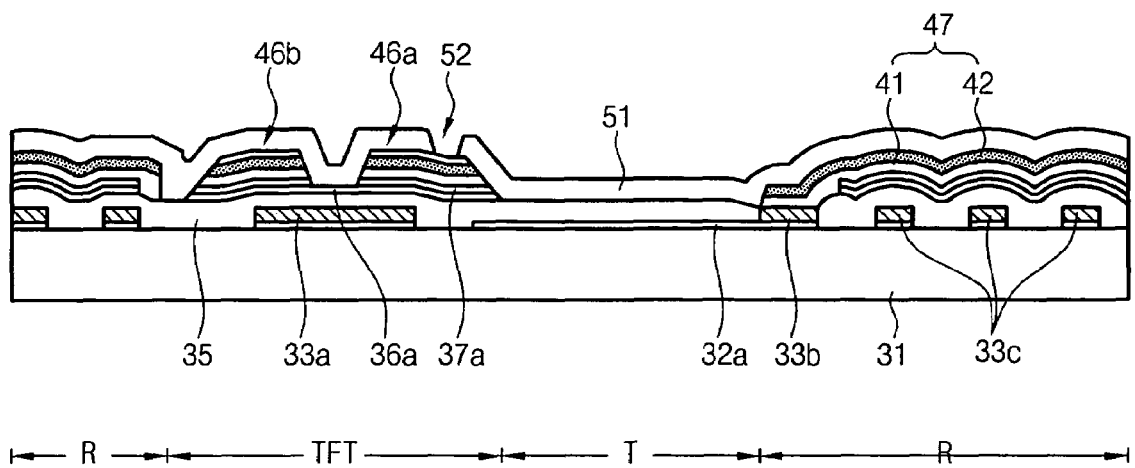

Referring to FIG. 4K, a protective layer 51 is formed on the front surface of the resultant, which has the reflective electrode 47 and TFT 50 formed thereon, with a thickness of about 2000 Å using an organic insulation material (e.g. silicon nitride). A fourth mask is used to etch the protective layer 51 to form a fourth photosensitive layer pattern (not shown) for exposing the top of the source electrode 46a of the TFT 50, for example. The fourth photosensitive layer pattern is used as an etching mask to etch the protective layer 51, so that a second via hole 52 is formed to expose the source electrode 46a of the TFT 50. The fourth photosensitive layer pattern is then removed.

Figure 4L:
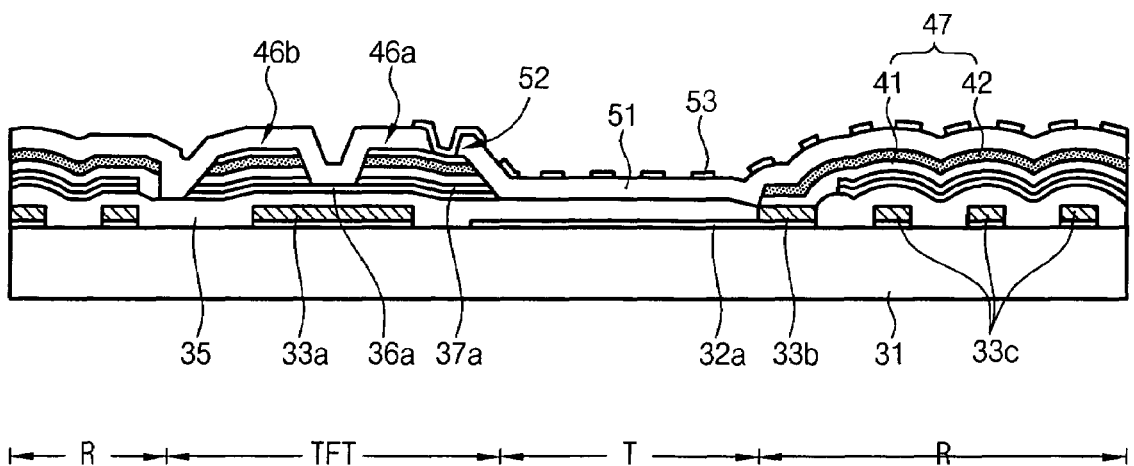

Referring to FIG. 4L, an ITO layer is deposited on the protective layer 51, including the second via hole 52. A fifth mask is used to form a fifth photosensitive layer pattern on the ITO layer, in order to cover a region for forming a first pixel electrode in the transmissive region T and a region for forming a second pixel electrode in the reflective region R. The fifth photosensitive layer pattern is used as an etching mask to etch the ITO layer, so that slit-type pixel electrodes 53 are formed in the transmisive and reflective regions T and R, respectively.

The fifth photosensitive layer pattern is then removed to complete an array substrate of a translucent FFS-mode LCD according to an embodiment of the present invention.

Figure 5:
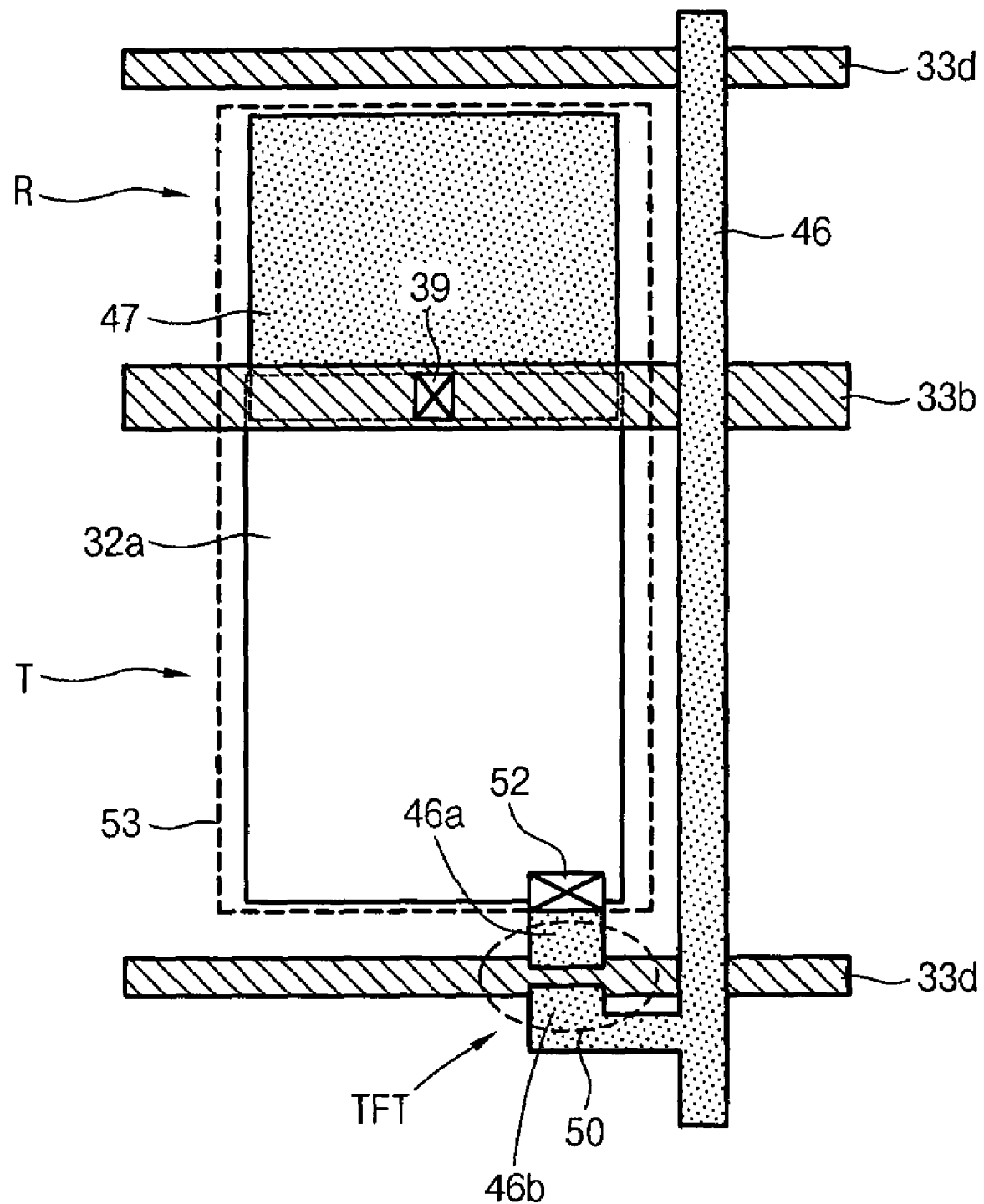
FIG. 5 is a top view corresponding to FIG. 4L.

FIG. 5 is a top view corresponding to FIG. 4L. As shown, a gate line 33d intersects with a data line 46. A common electrode line 33b is positioned parallel to the gate line 33d, and a TFT 50 is positioned at an intersection of the gate line 33d and the data line 46. A counter electrode 32a of ITO is positioned in a transmissive region T, and a reflective electrode 47 is positioned in a reflective region R while contacting the common electrode line 33b through a first via hole 39.

A pixel electrode 53 of ITO is positioned in a pixel region, which is delimited by the gate line 33d and the data line 46.

Figure 6:
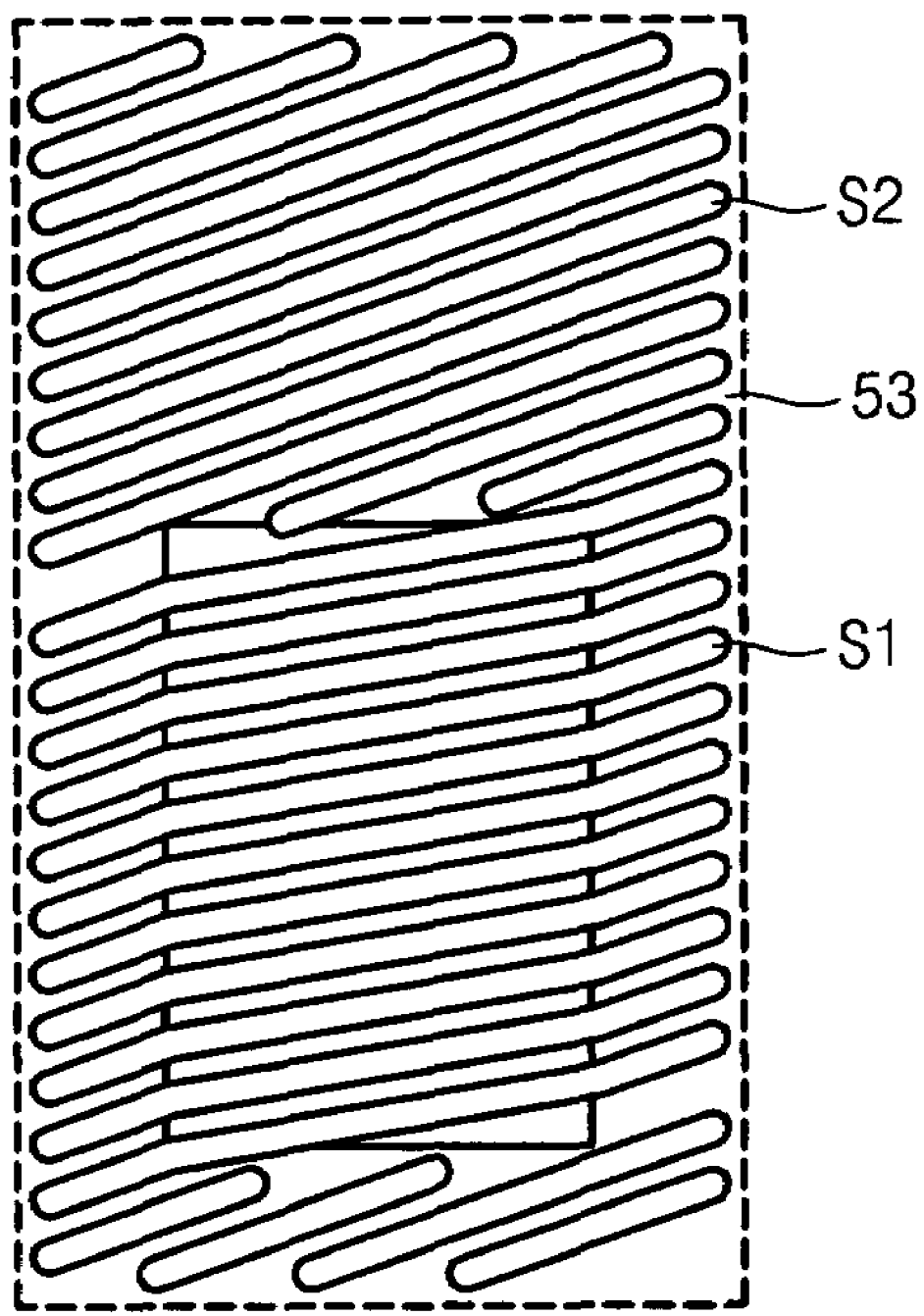
FIG. 6 is a top view magnifying a pixel electrode shown in FIG. 5.

The pixel electrode 53, as shown in FIG. 6, has a slit-type structure including a number of slits S1 and S2 having a predetermined slope in the reflective and transmissive regions R and T. Particularly, the slits S1 in the transmissive region T are bent in such a manner that their slope relative to a horizontal surface is smaller than that of the slits S2 in the reflective region R.

According to the method for manufacturing an array substrate of a translucent FFS-mode LCD according to an embodiment of the present invention, as mentioned above, the reflective electrode 47, which acts as a source/drain metal layer, is constructed as a dual layer of Mo and Al in the reflective region R for excellent reflectivity properties, and as a triple layer of Mo—Al—Mo in the TFT region for excellent contact with the pixel electrode of ITO.

In addition, 5 masks are used to manufacture an array substrate according to the inventive method. Considering that at least 8 masks are necessary according to the prior art, the present invention can reduce the number of masks by 3. This reduces the manufacturing cost and simplifies the processes.

Although the gate line including the gate electrode, the common electrode line, the embossing pattern, and the counter electrode of ITO are formed in a first mask process using half-tone exposure technology according to an embodiment of the present invention, an array substrate may also be manufactured, according to another embodiment of the present invention, by forming the counter electrode of ITO using a mask, forming the gate line including the gate electrode, the common electrode line, and the embossing pattern using another mask, and performing the following processes in the same manner as the above-mentioned embodiment.

In this case, a total of 6 masks are necessary, and the number of masks used is reduced by 2 compared with the prior art. This reduces the manufacturing cost and simplifies the processes.

Although the above embodiments have been described with reference to an FFS mode, wherein the transmissive and reflective regions are driven by horizontal electrical fields between the counter and pixel electrodes and between the reflective and pixel electrodes, respectively, the present invention is also applicable to a method for manufacturing an array substrate of a translucent TN-mode LCD.

It is obvious to those skilled in the art that, although not described and shown in detail, no counter electrode of ITO needs to be formed in the TN mode, in contrast to the FFS mode. Consequently, the half-tone exposure technology may be omitted when performing the process using a first mask as in the above embodiment. In addition, during the process using a fifth mask, the pixel electrode may solely be formed in the transmissive region (i.e. it is unnecessary in the reflective region). The second, third, and fourth mask processes are performed in the same manner as in the above embodiment.

Although the top Mo in the reflective region is selectively removed by using half-tone exposure technology in the third mask process for forming a data line, including source and drain electrodes, and a reflective electrode in the above embodiment, the top Mo may be removed from the reflective region, as well as from the TFT region, by using conventional exposure technology. This is because, although pure Al has high contact resistance with ITO and may cause some problems, when Mo is deposited on pure Al and then removed, Mo particles stuck into the surface of Al by sputtering are not completely removed, but some of them remain. As ITO comes in contact with Al in this manner, Mo particles on the surface decrease the contact resistance.

As mentioned above, the present invention is advantageous in that, since the source/drain metal layer, which is used as a reflective electrode, has a triple-layered structure of Mo—Al—Mo and the top Mo is selectively removed from the reflective region, it is possible to secure excellent reflectivity properties in the reflective region, as well as good electrical contact in the TFT region. As a result, the screen quality of products improves.

In addition, about 5-6 masks are enough to manufacture an array substrate using half-tone exposure technology according to the present invention, in contrast to the prior art which uses 8-11 masks. As the number of masks and processes is reduced in this manner, the manufacturing cost decreases accordingly and the process is simplified.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for manufacturing an array substrate of a translucent LCD comprising the steps of:
    forming an ITO layer and a gate metal layer successively on a glass substrate, the pixel unit of the glass substrate being divided into a TFT region, a reflective region, and a transmissive region;
    performing a first mask process using half-tone exposure technology and an etching process to the gate metal layer and the ITO layer to form a gate line, a common electrode line, a plate-type counter electrode of ITO, and an embossing pattern, the gate line including a gate electrode, the counter electrode being positioned in the transmissive region, and the embossing pattern being positioned in the reflective region;
    forming a gate insulation layer, an amorphous silicon layer, and a doped amorphous silicon layer successively on a front surface of the glass substrate having the gate line including the gate electrode, the common electrode line, the counter electrode, and the embossing pattern formed thereon;
    performing a second mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region;
    forming a triple layer on the gate insulation layer including the first via hole and the active pattern by successively forming a bottom Mo layer, an Al layer, and a top Mo;
    performing a third mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region;
    forming a protective layer on a front surface of a resultant having the source/drain electrode and the reflective electrode formed thereon;
    performing a fourth mask process and an etching process to the protective layer to form a second via hole exposing the source/drain electrode;
    forming an ITO layer on the protective layer including the second via hole; and
    performing a fifth mask process and an etching process to the ITO layer to form a slit-type pixel electrode positioned in both the transmissive and reflective regions while contacting the source/drain electrode.

2. The method as claimed in claim 1, wherein the step of performing a first mask process and an etching process to form a gate line, a common electrode line, a counter electrode, and an embossing pattern comprises the steps of:

applying a half-tone exposure process to the gate metal layer to form a first photosensitive layer pattern in such a manner that a part of the first photosensitive layer pattern covering a region for forming a counter electrode has a thickness smaller than a thickness of parts of the first photosensitive layer pattern covering a region for forming a gate line including a gate electrode, a region for forming a common electrode line, and a region for forming an embossing pattern;

etching the gate metal layer and the ITO layer using the first photosensitive layer pattern as an etching mask to form a gate line including a gate electrode, a common electrode line, and an embossing pattern;

ashing the first photosensitive layer pattern to remove the part of the first photosensitive layer pattern covering the region for forming a counter electrode;

removing the gate metal layer on the counter electrode using the ashed first photosensitive layer pattern as an etching mask; and removing the remaining first photosensitive layer pattern.

3. The method as claimed in claim 1, wherein the step of performing a second mask process and an etching process to form a first via hole and an active pattern comprises the steps of:

applying a half-tone exposure process to the doped amorphous silicon layer to form a second photosensitive layer pattern in such a manner that a part of the second photosensitive layer pattern covering the transmissive region has a thickness smaller than a thickness of parts of the second photosensitive layer pattern covering a region for forming an active pattern and a region for forming a reflective electrode;

etching the doped amorphous silicon layer, the amorphous silicon layer, and the gate insulation layer using the second photosensitive layer pattern as an etching mask to form a first via hole for exposing the common electrode line;

ashing the second photosensitive layer pattern to remove a part of the second photosensitive layer pattern formed in the transmissive region;

etching the doped amorphous silicon layer and the amorphous silicon layer using the ashed second photosensitive layer pattern as an etching mask to form an active pattern; and removing the remaining second photosensitive layer pattern.

4. The method as claimed in claim 1, wherein the step of performing a third mask process and an etching process to form a data line and a reflective electrode comprises the steps of:

applying a half-tone exposure process to the triple layer having a bottom Mo layer, an Al layer, and a top Mo layer formed on one another to form a third photosensitive layer pattern in such a manner that a part of the third photosensitive layer pattern covering a region for forming a reflective electrode has a thickness smaller than a thickness of a part of the third photosensitive layer pattern covering a region for forming a data line including a source/drain electrode;

etching the triple layer using the third photosensitive layer pattern as an etching mask to form a data line including a source/drain electrode;

ashing the third photosensitive layer pattern to remove a part of the third photosensitive layer pattern formed in the region for forming a reflective electrode;

etching the top Mo layer in the reflective region using the ashed third photosensitive layer pattern as an etching mask to form a reflective electrode as a dual layer having a bottom Mo layer and an Al layer; and removing the remaining third photosensitive layer pattern.

5. The method as claimed in claim 1, wherein the bottom Mo layer is formed with a thickness of 500-700 Å, the Al layer is formed with a thickness of 1400-1600 Å, and the top Mo layer is formed with a thickness of 100-200 Å.

6. The method as claimed in claim 1, wherein the reflective electrode is formed to have embossing by means of the embossing pattern.

7. The method as claimed in claim 1, wherein the transmissive and reflective regions are driven in an FFS mode by horizontal electrical fields between the counter and pixel electrodes and between the reflective and pixel electrodes, respectively.

8. A method for manufacturing an array substrate of a translucent LCD comprising the steps of:

forming an ITO layer and a gate metal layer successively on a glass substrate, the pixel unit of the glass substrate being divided into a TFT region, a reflective region, and a transmissive region;

forming an ITO layer on the gate metal layer;

performing a first mask process and an etching process to the ITO layer to form a plate-type counter electrode of ITO in the transmissive region;

forming a gate metal layer on the glass substrate having the counter electrode formed thereon;

performing a second mask process and an etching process to the gate metal layer to form a gate line, a common electrode line, and an embossing pattern, the gate line including a gate electrode, and the embossing pattern being positioned in the reflective region;

forming a gate insulation layer, an amorphous silicon layer, and a doped amorphous silicon layer successively on a front surface of the glass substrate having the gate line including the gate electrode, the common electrode line, the counter electrode, and the embossing pattern formed thereon;

performing a third mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region;

forming a triple layer on the gate insulation layer including the first via hole and the active pattern by successively forming a bottom Mo layer, an Al layer, and a top Mo;

performing a fourth mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region;

forming a protective layer on a front surface of a resultant having the source/drain electrode and the reflective electrode formed thereon;

performing a fifth mask process and an etching process to the protective layer to form a second via hole exposing the source/drain electrode;

forming an ITO layer on the protective layer including the second via hole; and performing a sixth mask process and an etching process to the ITO layer to form a slit-type pixel electrode contacting the source/drain electrode.

9. A method for manufacturing an array substrate of a translucent LCD comprising the steps of:

forming a gate metal layer on a glass substrate, the pixel unit of the glass substrate being divided into a TFT region, a reflective region, and a transmissive region;

performing a first mask process and an etching process to the gate metal layer to form a gate line, a common electrode line, and an embossing pattern, the gate line including a gate electrode, and the embossing pattern being positioned in the reflective region;

forming a gate insulation layer, an amorphous silicon layer, and a doped amorphous silicon layer successively on a front surface of the glass substrate having the gate line including the gate electrode, the common electrode line, and the embossing pattern formed thereon;

performing a second mask process using half-tone exposure technology and an etching process to the doped amorphous silicon layer, the amorphous silicon layer, and the gate insulation layer to form a first via hole and an active pattern, the first via hole exposing the common electrode line, and the active pattern being positioned in the TFT region;

forming a triple layer on the gate insulation layer including the first via hole and the active pattern by successively forming a bottom Mo layer, an Al layer, and a top Mo;

performing a third mask process using half-tone exposure technology and an etching process to the triple layer to form a data line and a reflective electrode, the data line constituting a TFT and including a source/drain electrode configured as a triple layer having a bottom Mo layer, an Al layer, and a top Mo layer, and the reflective electrode being configured as a double layer having a bottom Mo layer and an Al layer and positioned in the reflective region;

forming a protective layer on a front surface of a resultant having the source/drain electrode and the reflective electrode formed thereon;

performing a fourth mask process and an etching process to the protective layer to form a second via hole exposing the source/drain electrode;

forming an ITO layer on the protective layer including the second via hole; and performing a fifth mask process and an etching process to the ITO layer to form a pixel electrode in the transmissive region while contacting the source/drain electrode.

10. The method as claimed in claim 9, wherein the step of performing a second mask process and an etching process to form a first via hole and an active pattern comprises the steps of:

applying a half-tone exposure process to the doped amorphous silicon layer to form a second photosensitive layer pattern in such a manner that a part of the second photosensitive layer pattern covering the transmissive region has a thickness smaller than a thickness of parts of the second photosensitive layer pattern covering a region for forming an active pattern and a region for forming a reflective electrode;

etching the doped amorphous silicon layer, the amorphous silicon layer, and the gate insulation layer using the second photosensitive layer pattern as an etching mask to form a first via hole for exposing the common electrode line;

ashing the second photosensitive layer pattern to remove a part of the second photosensitive layer pattern formed in the transmissive region;

etching the doped amorphous silicon layer and the amorphous silicon layer using the ashed second photosensitive layer pattern as an etching mask to form an active pattern; and removing the remaining second photosensitive layer pattern.

11. The method as claimed in claim 9, wherein the step of performing a third mask process and an etching process to form a data line and a reflective electrode comprises the steps of:

applying a half-tone exposure process to the triple layer having a bottom Mo layer, an Al layer, and a top Mo layer formed on one another to form a third photosensitive layer pattern in such a manner that a part of the third photosensitive layer pattern covering a region for forming a reflective electrode has a thickness smaller than a thickness of a part of the third photosensitive layer pattern covering a region for forming a data line including a source/drain electrode;

etching the triple layer using the third photosensitive layer pattern as an etching mask to form a data line including a source/drain electrode;

ashing the third photosensitive layer pattern to remove a part of the third photosensitive layer pattern formed in the region for forming a reflective electrode;

etching the top Mo layer in the reflective region using the ashed third photosensitive layer pattern as an etching mask to form a reflective electrode as a dual layer having a bottom Mo layer and an Al layer; and removing the remaining third photosensitive layer pattern.

12. The method as claimed in claim 9, wherein the bottom Mo layer is formed with a thickness of 500-700 Å, the Al layer is formed with a thickness of 1400-1600 Å, and the top Mo layer is formed with a thickness of 100-200 Å.

13. The method as claimed in claim 9, wherein the reflective electrode is formed to have embossing by means of the embossing pattern.

14. The method as claimed in claim 9, wherein the transmissive and reflective regions are driven in a TN mode.

* * * * *